United States Patent [19]

Drury, Jr.

[11] Patent Number: 5,279,065
[45] Date of Patent: Jan. 18, 1994

[54] FISHING LINE

[76] Inventor: William E. Drury, Jr., 10 B St., Merrimac, Mass. 01860

[21] Appl. No.: 83,648

[22] Filed: Jun. 25, 1993

[51] Int. Cl.⁵ ............................................ A01K 85/14
[52] U.S. Cl. ....................................................... 43/42.52
[58] Field of Search ................ 43/42.5, 42.52, 44.8, 43/42.37, 44.4

[56] References Cited

U.S. PATENT DOCUMENTS

| | | | |
|---|---|---|---|
| 1,471,280 | 10/1923 | Reekers | 43/42.5 |
| 1,987,839 | 1/1935 | Moilanen | 43/42.52 |
| 2,380,328 | 7/1945 | Pecher | 43/42.5 |
| 2,481,710 | 9/1949 | Arndt | 43/42.52 |
| 2,748,523 | 6/1956 | McNabb | 43/42.5 |
| 2,908,104 | 10/1959 | Hutchins et al. | 43/42.52 |
| 4,894,945 | 1/1990 | Perrine | 43/42.5 |
| 5,129,176 | 7/1992 | Gudermuth, Jr. | 43/42.52 |

Primary Examiner—Paula A. Bradley
Assistant Examiner—Jeanne M. Elpel
Attorney, Agent, or Firm—Edward A. Gordon

[57] ABSTRACT

The present invention provides a new and improved fishing lure in which the main features of the fishing lure comprises a substantially flat one-piece body portion from the leading front end to the back end. The intermediate portion of the body portion extends to the leading front in a taper providing a decreasing width to a pointed front end and extends to the opposing back end in a taper providing a decreasing width to a circular rear end which contains a hole to include the attachment of a rotatable hook device such as a split ring or snap device to which a fishing line is attached. The leading front portion of the body frame device includes a vertical side portion which extends upwardly and about the top edge portion of the leading front portion of the body device with a hole in the front portion adapted to receive the shank portion of the hook which is attached to the forward portion of the body frame. The construction of the fishing lure of the present invention provides movement very similar to that of fish when swimming and thereby provides an effective lure.

9 Claims, 2 Drawing Sheets

FISHING LINE

BACKGROUND OF THE INVENTION

1. Field of the Invention

The present invention relates to fishing lures of those types or kinds employed in trolling and more particularly to a new and improved fishing lure.

2. Description Of Prior Art

There are numerous prior art fishing lures which glide in water away from a fisherman.

U.S. Pat. No. 4,845,883 discloses a fishing lure made of a soft, non-rigid material shaped and weighted to glide in water. Weights precisely balance the lure to produce the glide and to stabilize deflection of the lure caused by any tendency of the soft, non-rigid material to deflect. A hook for catching fish is attached to the lure and provides the means for connecting the lure to a fishing line controlled by a fisherman.

U.S. Pat. No. 3,981,096 discloses a fishing lure in the form of an elongate spoon-shaped body having a substantially flat intermediate portion. The intermediate portion extends at one end into a weighted tapered leading portion and extends at the other end into an upwardly inclined, substantially flat and relatively thin trailing portion. Each end portion is adapted to be attached to a hook or a fishing line.

U.S. Pat. No. 1,450,546 discloses a trolling spoon having lateral reaction surfaces at each side of its rear end increasing in width rearwardly and a laterally extending reaction surface connecting the rear ends of said lateral reaction surfaces, the body of the spoon forwardly of said lateral reaction surfaces being bent to give it a slight curvature in a lengthwise direction and also having a trough-like rib extending from between said reaction surfaces forwardly through the central section of its length.

The following U.S. Patents are also believed to exemplify the present state of the art with respect to fishing lures: U.S. Pat. Nos. 3,238,660; 2,908,104; 2,889,657; 2,629,961; 2,481,710; and 1,803,056.

While such prior art devices provide improvement in the areas intended, there still exists a need for a new and improved gliding fishing lure device which has a unique but simple construction which overcomes the disadvantages of the prior art while providing utility features which provide new and useful advantages and improvements not heretofore disclosed.

Accordingly a principle desirable object of the present invention is to provide a new and improved fishing lure which overcomes some or all of the disadvantages of the prior art devices.

Another desirable object of the present invention is to provide a fishing lure construction which will provide and secure a type of action which will be attractive to fish.

Another desirable object of the present invention is to provide a construction and configuration resulting in a streamlined aerodynamic fishing lure that has very little resistance as it travels through the water along a diagonal forward glide path.

A still further desirable object of the present invention is to achieve the above desirable objects with an essentially simple structure, lending itself to inexpensive massproduction.

These and other desirable objects of the invention will in part appear hereinafter and will in part become apparent after consideration of the specification with reference to the accompanying drawings and the claims.

SUMMARY OF THE INVENTION

The present invention provides a new and improved fishing lure in which the main features of the fishing lure comprises a substantially flat one-piece body portion from the leading front end to the back end. The intermediate portion of the body portion extends to the leading front in a taper providing a decreasing width to a pointed front end and extends to the opposing back end in a taper providing a decreasing width to a circular rear end which contains a hole to include the attachment of a rotatable hook device such as a split ring or snap device to which a fishing line is attached. The leading front portion of the body frame device includes a vertical side portion which extends upwardly and about the top edge portion of the leading front portion of the body device with a hole in the front portion adapted to receive the shank portion of the hook which is attached to the forward portion of the body frame. The construction of the fishing lure of the present invention provides movement very similar to that of fish when swimming and thereby provides an effective lure.

It has further been found that the fishing lure of the present invention provides an angler controlled fishing lure that travels along a diagonally descending glide path in water, or travels along a horizontal path through the water depending upon the anglers choice of retrieve, comprising a rigid hard material body shaped and balanced to initiate the necessary lift to glide diagonally through the water or to travel along a horizontal path through the water including a hook associated with the rigid hard body for catching fish. The fishing lure includes means for providing operator control to place the fishing lure in position to move along a diagonal descending glide or to travel along a horizontal path, an overall configuration associated with the rigid hard body resulting in the capability for the fishing lure to travel along a diagonally descending travel path or to travel along a horizontal path depending upon anglers control.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein.

DETAILED DESCRIPTION OF PREFERRED EMBODIMENTS

Figure 1:
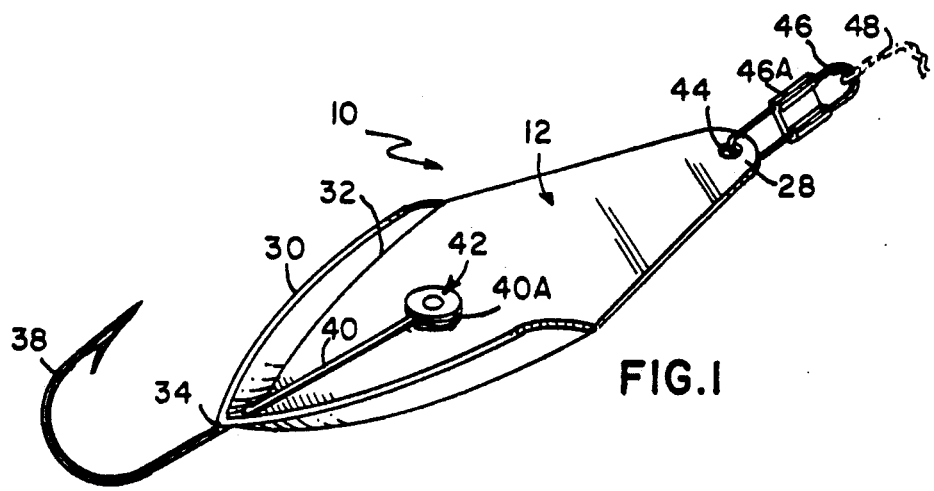
FIG. 1 is a perspective view of a preferred embodiment of a fishing lure incorporating the principle features of the present invention.

Referring now to the drawings, there is illustrated a preferred embodiment of the fishing lure indicated generally by the numeral 10 embodying the principles of the present invention. As illustrated, the fishing lure 10 includes a substantially perfectly flat body member 12 which is of uniform cross-sectional thickness 14 from the upper edge surface 16 to the bottom surface 18.

The forward or front body leading portion or section 20 tapers from the intermediate portion 22 (indicated by the dotted lines in FIG. 2) in decreasing width to the front point 24. The back portion or section 26 tapers from the intermediate portion 22 in decreasing width to a circular end section 28.

Figure 8:
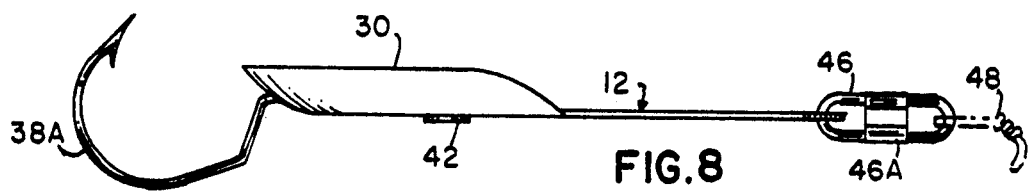
FIG. 8 is a side elevation view of an alternate embodiment of the hook of the fishing lure of the present invention.

A vertical device section 30 extends upwardly and about the top edge portion 32 of the leading front section 20 of the body member 12 forming an upper front point 34 with a hole 36. The fish hook 38 includes a shank portion 40 extending through the upper front hole 36 and extending along the upper surface 16 of the forward section 20 to an attaching means 42. As illustrated in FIG. 8 the fish hook section 38A has a different configuration in accordance with the present invention.

The circular end section 28 is provided with a hole 44 to which is attached means such as a ring device 46 for attaching a conventional fishing line 48. In this embodiment the ring device 46 includes a securing device 46A.

Figure 9:
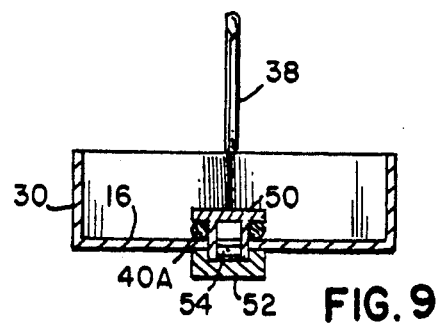
FIG. 9 is a cross-sectional view taken along the line 9—9 of FIG. 3.

Referring now to FIG. 9, the embodiment of the attaching means 42 comprises an upper bolt portion having an upper circular cover device 50 which contacts the rear circular portion 40A of the shank portion 40 and holds it against the upper surface 16 of the body member 12, and an associated bottom nut portion 52 which is releasably attached to the upper bolt portion 50 from under the bottom surface 18 of the body member 12. The releasable attachment is preferably done by inner screwing means 54 of the nut device 52 which is attached to the lower inner surface section 56 of upper bolt portion 50.

Figure 10:
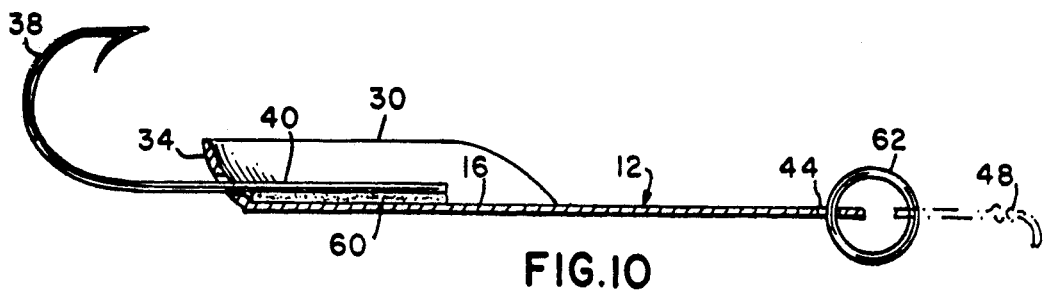
FIG. 10 is a cross-sectional view of an alternate embodiment of the fishing lure of the present invention.

Referring now to FIG. 10 there is illustrated an alternate embodiment of the fishing lure of the present invention. In this embodiment the shank portion 40 of the fish hook 38 is attached to the upper edge surface 16 of the body member 12 by soldering or welding by various alloy means 60 which is prepared and applied between the shank portion 40 and the upper edge surface 16. Additionally a ring device 62 is attached to the hole portion 44 and to which the conventional fishing line 48 is attached.

Figure 2:
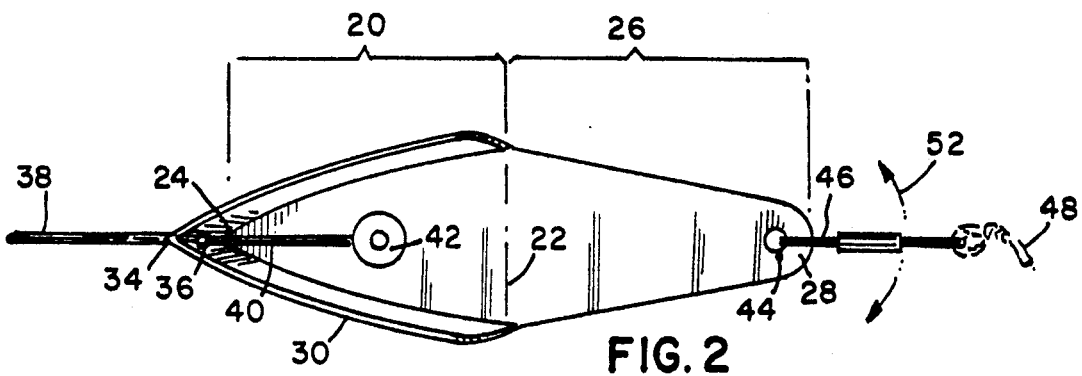
FIG. 2 is a top plan view of the fishing lure of FIG. 1.
Figure 3:
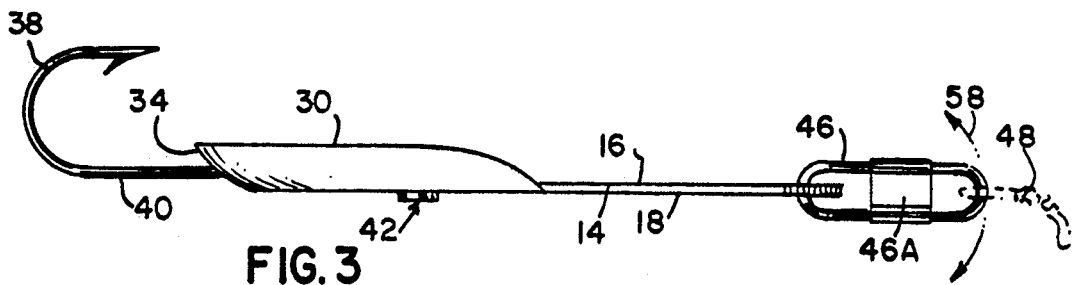
FIG. 3 is a left side elevation view of the fishing lure of FIG. 1.
Figure 4:
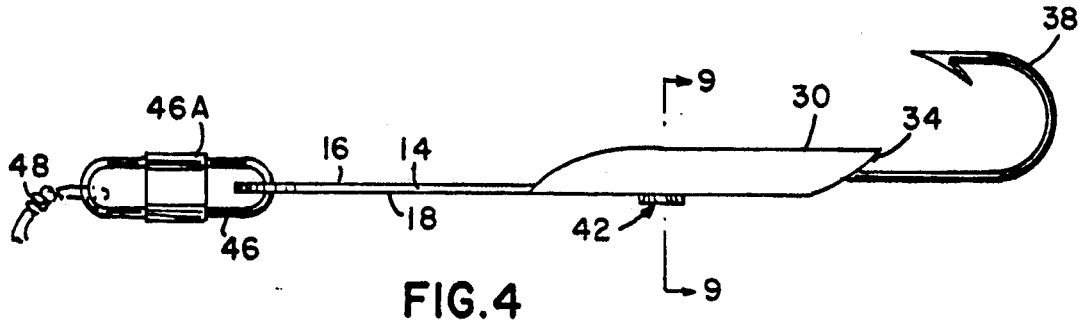
FIG. 4 is a right side elevation view of the fishing lure of FIG. 1.
Figure 5:
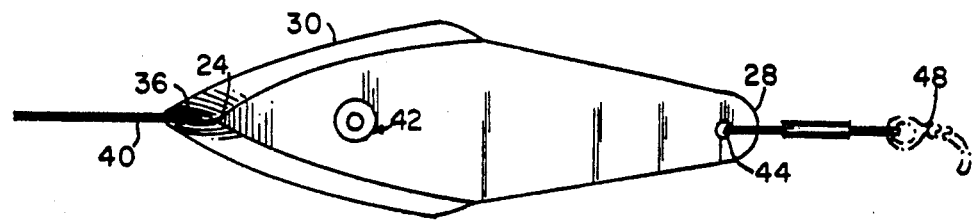
FIG. 5 is a bottom view of the fishing lure of FIG. 1.
Figure 6:
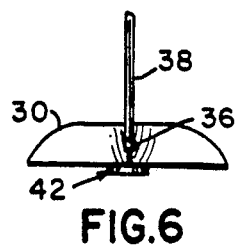
FIG. 6 is a front view of the fishing lure of FIG. 1.
Figure 7:
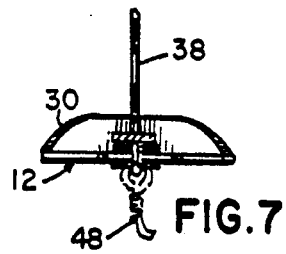
FIG. 7 is a back view of the fishing lure of FIG. 1.

As illustrated by the line 56 in FIG. 2 and 58 in FIG. 3, the ring device 46 which is attached at one end to the rear hole 44 is able to rotate about the end section 28 such as left and right as shown in FIG. 3 up and down as shown in FIG. 2 or in a circular movement by using both movements.

In a preferred embodiment the body member 12 including the vertical section 30 is preferably formed of a rigid hard material such as, for example, metal such as aluminum.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A fishing lure comprising:
   an elongated body;
   said body having a substantially flat intermediate portion, a substantially flat leading portion and a substantially flat back portion, each having a top and bottom surface;
   said body leading portion tapering from the intermediate portion in decreasing width to a front point;
   said body back portion tapering from the intermediate portion in decreasing width to a circular end;
   a vertical device extending upwardly and about the top edge portion of the leading front of the body and forming an upper front point;
   a hole in the upper front;
   a hook having a shank portion extending through the upper front hole;
   means for attaching the shank portion to the flat leading portion; and
   said circular end of the body back portion having means for attaching a line.

2. The fishing lure according to claim 1 wherein the elongated body is formed of a rigid hard material.

3. The fishing lure according to claim 1 wherein the elongated body is formed of aluminum.

4. The fishing lure according to claim 1 wherein the circular end of the body back portion comprises a vertical hole and a rotatable device attached to the vertical hole and having a fishing line attached to the rear portion of the rotatable device.

5. The fishing lure according to claim 1 the upper front hole through which the shank portion of the hook extends and the means for attaching the shank portion to the flat leading portion provides a non-movable hook.

6. A fishing lure comprising:
   an elongated body;
   said body having a substantially flat intermediate portion, a substantially flat leading portion and a substantially flat back portion, each having a top and bottom surface;
   said body leading portion tapering from the intermediate portion in decreasing width to a front point;
   said body back portion tapering from the intermediate portion in decreasing width to a circular end;
   a vertical device extending upwardly and about the top edge portion of the leading front of the body and forming an upper front point;
   a hole in the upper front point;
   a hook having a shank portion extending through the upper front hole;
   means for attaching the shank portion to the top flat leading portion to provide a non-movable hook;
   said circular end of the body back portion comprising a vertical hole; and
   a rotatable device attached to the vertical hole to have a fishing line attached to the rear portion of the rotatable device.

7. A fishing lure device for the traveling along a diagonally descending glide path through the water or traveling along a horizontal path through the water comprising:
   an elongated body formed of rigid hard material;

said body having a substantially flat intermediate portion, a substantially flat leading portion and a substantially flat back portion, each having a top and bottom surface; said body leading portion tapering from the intermediate portion in decreasing width to a front point;

said body back portion tapering from the intermediate portion in decreasing width to a circular end;

a vertical device extending upwardly and about the top edge portion of the leading front of the body and forming an upper front point;

a hole in the upper front point;

a hook having a shank portion extending through the upper front hole;

means for attaching the shank portion to the top flat leading portion to provide a non-movable hook;

said circular end of the body back portion comprising a vertical hole; and a ring device attached to the vertical hole to have a fishing line attached to the rear portion of the ring device;

said ring device providing rotation of the body portion while attached to a fishing line as it is propelled through water.

8. The fishing lure device according to claim 7 wherein the means for attaching the shank portion to the top flat leading portion comprises an upper bolt device having an upper cover device which holds the shank portion against the upper surface of the body member and a nut device releasably attached to the bolt device from under the bottom surface of the body member.

9. The fishing lure device according to claim 7 wherein the means for attaching the shank portion to the top flat leading portion comprises solder means which unites the shank portion to the upper surface of the body member.

* * * * *

UNITED STATES PATENT AND TRADEMARK OFFICE
CERTIFICATE OF CORRECTION

PATENT NO. : 5,279,065
DATED : January 18, 1994
INVENTOR(S) : William E. Drury, Jr.

It is certified that error appears in the above-indentified patent and that said Letters Patent is hereby corrected as shown below:

In the title, "Fishing Line" should read --Fishing Lure--.

Signed and Sealed this

Eighth Day of March, 1994

Attest:

BRUCE LEHMAN

*Attesting Officer*     *Commissioner of Patents and Trademarks*